May 14, 1935.  B. J. BRUGGE  2,001,179
ELECTRIC ARC WELDING
Filed Feb. 2, 1933   2 Sheets-Sheet 1

INVENTOR.
Bernard J. Brugge
BY
Fay, Oberlin & Fay
ATTORNEYS.

May 14, 1935. B. J. BRUGGE 2,001,179
ELECTRIC ARC WELDING
Filed Feb. 2, 1933   2 Sheets-Sheet 2

INVENTOR.
Bernard J. Brugge
BY
Fay, Oberlin & Fay
ATTORNEYS.

Patented May 14, 1935

2,001,179

UNITED STATES PATENT OFFICE 2,001,179

ELECTRIC ARC WELDING

Bernard J. Brugge, Cleveland, Ohio, assignor to The Lincoln Electric Company, Cleveland, Ohio, a corporation of Ohio Application February 2, 1933, Serial No. 654,834

11 Claims. (Cl. 219—10)

This invention relates as indicated to electric arc welding and more particularly to a method of and means for directing and controlling the blow of the welding arc.

As the welding operation proceeds by means of an arc maintained between the work and a suitable electrode and while the work and electrode are moved relatively to cause the latter to follow the line to be welded, various conditions cause the arc to either stick in local areas or to wander erratically so that unless controlled in some manner, the arc will not truly follow the relative movement of the electrode over the work. A further difficulty is encountered when welding the seam at the ends of a piece of work. The arc has a tendency to lag behind the electrode in approaching the finish end of the work and to lead the electrode when starting a piece of work.

It is among the objects of my invention to provide a method and apparatus for controlling and directing the blow of the welding arc so that the above difficulties will be overcome. Other objects of my invention will appear as the description proceeds.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

Figure 1:
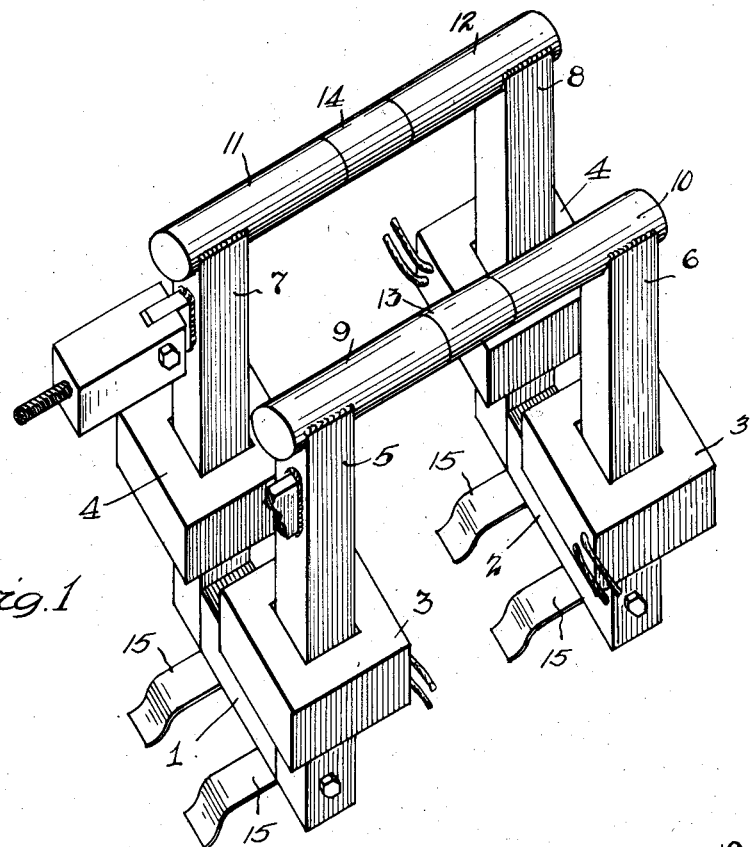
Figure 2:
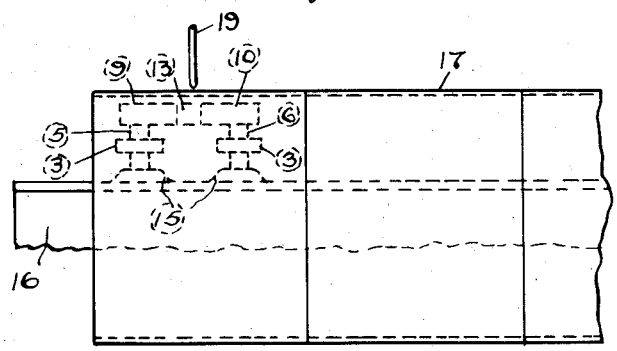
Figure 3:
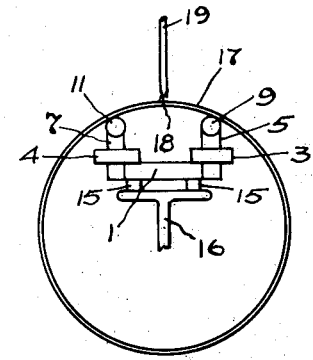
Figure 6:
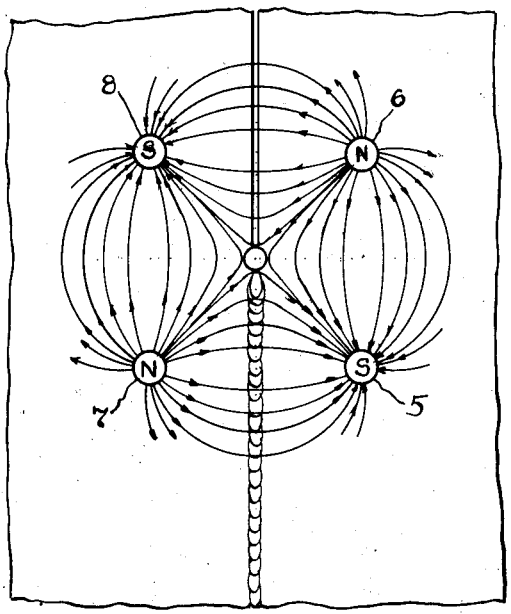
Figure 8:
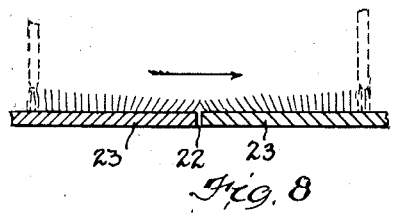
Figure 4:
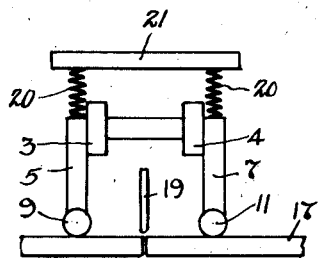
Figure 5:
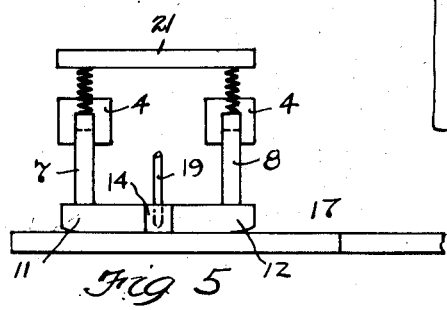
Figure 7:
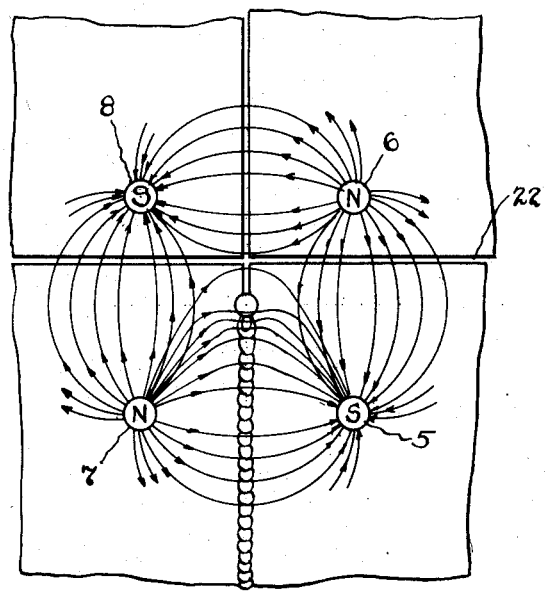

In said annexed drawings:

Figure 1 is an isometric view of one form of apparatus adapted to be employed to carry out the method comprising my invention; Figure 2 shows such apparatus arranged in position to weld a cylindrical article; Figure 3 is an end view of the disclosure of Figure 2; Figure 4 shows apparatus similar to that illustrated in Figure 1, positioned on the same side of the work as the electrode; Figure 5 is a side elevational view of the disclosure in Figure 4; Figure 6 is a diagrammatic representation of the magnetic field produced in the vicinity of the arc by the apparatus disclosed in the previous figures; Figure 7 is a diagrammatic representation of the magnetic field in the vicinity of the arc produced by the apparatus illustrated in the previous figures as the electrode approaches the ends of the work being welded; and Figure 8 is a diagrammatic representation of what is termed undesirable end effect on the arc.

In order that the method comprising my invention may be more readily understood, one form of apparatus adapted to carry forth such method and more particularly to produce the novel type of arc stabilizing and controlling magnetic field, will first be described.

Referring now more specifically to Figure 1, the illustrated form of apparatus comprises two electro-magnets having U-shaped cores 1 and 2 respectively on which are wound paired coils 3 and 4. As hereinafter more fully explained, the coils 3 will, for instance, be energized by direct current and the coils 4 may be energized by alternating current and such coils respectively may be connected across different phases of a polyphase alternating current circuit.

The upper ends 5, 6, 7 and 8 of the U-shaped cores 1 and 2 have secured thereto and in magnetic contact therewith pole piece extensions 9, 10, 11 and 12, respectively, the paired extensions 9 and 10 and 11 and 12 being for purposes of strengthening and reenforcing the electro-magnet assembly rigidly secured together by elements 13 and 14 formed of any suitable non-magnetic material.

The cores 1 and 2 may be provided with resilient feet such as 15, which may be, as illustrated in Figs. 2 and 3, employed to support the electro-magnets on some suitable means such as a rail 16 and to press the pole piece extensions against the work generally indicated at 17 on opposite sides of the seam 18. The welding electrode 19 which may be either fusible or non-fusible, depending upon the type of operation being performed, will preferably be arranged at the geometric center of the poles 5, 6, 7 and 8 of the electro-magnets.

Instead of positioning the electro-magnets below the work as illustrated in Figures 2 and 3, such magnets may be positioned on the same side of the work as the electrode, as illustrated in Figures 4 and 5 and in such case, the springs, generally indicated at 20, will, by means of a suitable support such as 21, press the electro-magnets to the work for the purpose hereinafter more fully explained.

At this point it may be well to note that for certain types of work it may be desirable to provide a current-carrying coil around the welding electrode which may either be connected in series with such electrode so that the magnetic flux of such coil will be produced by the welding current flowing therethrough or such coil around the electrode may be energized by a separate circuit which may be either alternating or direct current and if alternating, may be connected across one phase of the circuit in which the coils 3 and 4 of the electro-magnets are connected.

With the electro-magnets described in connection with Figures 1 to 5 positioned relatively to the work so that the welding electrode during relative movement along the work will be maintained in fixed relation to such magnets, the coils 3 and 4 will be energized by a current flowing in such direction as to produce the polarity illustrated in Figure 6. This polarity of the electro-magnets will produce a flux distribution such as is illustrated in this figure, such flux field being characterized by a central neutral zone in which the diametrically opposite lines of force will be equal and opposite, resulting in a magnetic field of zero intensity in such zone. This neutral zone maintains the welding arc as a straight, stiff column directly on the seam to be welded, so that the arc is prevented from wandering due to varying magnetic conditions encountered and this magnetic field is also effective to overcome or blanket out, at least to a large extent, the flux conditions set up in the work in the vicinity of the arc by the shifting flow therein of the welding current.

The provision of this type of magnetic field which contains a neutral zone for the purpose of defining and controlling the blow of the arc, is particularly useful to overcome so-called "end effects" when the arc is in the vicinity of the end of the work; whether a single piece or a plurality of work pieces are moved in succession past the end of the electrode. This overcoming of end effects can best be understood by having reference to Figures 7 and 8.

By having reference to Figure 8 can best be understood what is meant by above referred to "end effects" in arc welding. Assuming that the work and electrode presented in arcing relation thereto are moved relatively according to the direction indicated by the arrow, it will be noted that the arc under the electrode at an appreciable distance from the end of the work is substantially in axial alignment with the electrode or normal to the plane of the work. As the end of the work is approached, the arc gradually begins to lag the travel of the electrode until at the end of the work the arc has attained an appreciable back slant. As the electrode moves onto the end of the next piece of work the arc flips to a decided forward slant, i. e., the arc begins to lead the electrode. This leading continues until the starting end of the work has been left behind for an appreciable distance. This behavior of the arc results in excessive heating of the ends of the work as evidenced by holes actually burned through the metal particularly in the regions indicated at 23, especially when thin gauge stock is being welded. This undesirable end effect occurs not only when a plurality of work pieces are welded in succession but as well when a single piece is welded.

By having reference to Figure 7, it will be noted that the air gap generally indicated at 22 between successive pieces of work will cause the lines of force flowing from the pole 7 to the pole 5 to be restricted almost entirely to the two pieces of work being welded and similarly, the lines of force flowing from pole 6 to pole 8 to be confined almost entirely to the two plates comprising the succeeding piece of work which is to be welded. The current flowing in the welding electrode and the arc has its own field of flux therearound, the direction of which is usually counterclockwise as illustrated in Figure 7, due to the fact that the current in the welding arc usually flows from the work to the so-called welding electrode. The combination of the two magnetic fields, i. e., the lines of force around the electrode and the lines of force flowing from pole 7 to pole 5 will effect a concentration of such lines of force behind the electrode. This concentration of flux behind the welding arc causes the arc to be blown forward to correct the lag of the arc which would otherwise occur as illustrated in Fig. 8. The lines of force from pole 6 to pole 8 being confined almost entirely in the new piece of work due to the presence of the air gap 22, such lines of force will not be particularly effective to oppose this action of the flux concentration behind the arc to blow the same forward.

Since the flux from pole 5 to pole 7 is confined to the work piece which has just been welded, it tends to blow the arc forward, thereby counteracting the usual back blow, as just explained. When the arc is directly over the gap 22, the neutral zone of flux is substantially the same as illustrated in Fig. 6, and the arc passes in a straight or vertical position from one work piece to the other.

After the arc has passed to the new work piece, the flux from pole 6 to pole 8 tends to hold the arc straight by overcoming its tendency to blow forward. Since the air gap 22 cuts out the flux from pole 5 to 7, as soon as these poles pass over such air gap, the flux field therebetween gradually counteracts the back-blow effect of the flux between poles 6 and 8. This occurs at the same time that the end effect being overcome diminishes. The arc is therefore maintained straight at all times.

There is provided, therefore, a gradually increasing forward blow as the finish end of the work is approached, zero effect at the junction between work pieces, and a gradually decreasing back blow as the starting end of the work is left behind. The above enumerated advantages obtain whether a single piece of work is being welded or a plurality of pieces are moved in succession past the electrode, as well as at the beginning and finish of a series of pieces.

As previously indicated, the above defined form of magnetic field may be produced by simply energizing one of the sets of coils, such as 3, by means of direct current. In order to increase the intensity of the field, both pairs of coils might be energized by the same type of current such as direct current. Further, and in order to produce a slight well-defined and limited oscillation of the arc in order to spread its heating effect, one of the pairs of coils 3 or 4 may be energized by alternating current and the other by direct current, or both may be energized by alternating current. When alternating current is employed to energize the electro-magnets it may be desirable to energize one pair of coils such as 3 from one phase of a three-phase or two-phase circuit and the other pair of coils such as 4 from the other phase of the same circuit. Furthermore, a cross-cornered paired relationship may be established between the coils on the electro-magnets, i. e., one of coils 3 with the opposite coil 4 may be connected as a pair in any of the above defined arrangements or both coils on the same core may, for certain desired magnetic effects, be connected in the relationship which has been defined.

As previously indicated, it has been found desirable for certain types of work to employ a current-carrying coil arranged helically about the welding electrode so that a magnetic field will be established in which the lines of force are substantially parallel to the axis of the electrode and substantially normal to the plane of a considerable portion of the lines of flux of the field produced by the electro-magnets 3 and 4.

It is also within the contemplation of my invention to employ either alternating or direct current in the coil around the electrode and to connect such coil across one phase of a multiphase system, across the other phases of which the coils 3 and 4 may be connected in any of the previously defined arrangements.

The welding electrode will preferably be supported in fixed relation to the poles of the electro-magnets and usually at the geometric center of such magnets, i. e., at the intersection of the two diagonals joining diagonally opposite pole pieces.

When the electrode is so supported in relation to the poles of the magnets, the arc may be blown forward or in any desired direction by shifting of the neutral zone in the magnetic field produced by the electro-magnets. This shifting of the neutral zone may be accomplished by varying the intensity of the lines of force produced by at least one of the magnets employed. For this purpose a variable resistance will preferably be included in series with one or all of the windings of the magnets.

Instead of securing a uniform blow of the arc in a predetermined direction by a variation in the strength of one or more of the fields produced by the magnets, such blow may be secured by assembling the electrode and the magnets in fixed relation with the electrode displaced from the geometric center of the magnets.

Other modes of applying the principle of my invention may be employed instead of the one explained, change being made as regards the means and the steps herein disclosed, provided those stated by any of the following claims or their equivalent be employed.

I, therefore, particularly point out and distinctly claim as my invention:—

1. In metal working by electricity, the steps which consist in establishing an arc between the work and a suitable electrode, and at the same time directing the arc by means of magnetic fields, the lines of force in which are concentrated in areas extending across the line being welded on opposite sides of the arc.

2. In metal working by electricity, the steps which consist in establishing an arc between the work and a suitable electrode, and at the same time directing the arc by means of magnetic fields, the lines of force in which are concentrated and flow in opposite directions in areas extending across the line being welded on opposite sides of the arc.

3. In metal working by electricity, the steps which consist in establishing an arc between the work and a suitable electrode, and at the same time directing the one by means of magnetic fields, the lines of force in which are concentrated in areas extending along the line being welded on opposite sides of the arc.

4. In metal working by electricity, the steps which consist in establishing an arc between the work and a suitable electrode, and at the same time directing the arc by means of magnetic fields, the lines of force in which are concentrated and flow in opposite directions in areas extending along the line being welded on opposite sides of the arc.

5. In metal working by electricity, the steps which consist in establishing an arc between the work and a suitable electrode, and at the same time directing the arc by means of magnetic fields, the lines of force in which are concentrated in areas respectively extending across and along the line being welded on different sides of the arc.

6. In metal working by electricity, the steps which consist in establishing an arc between the work and a suitable electrode, and at the same time directing the arc by means of magnetic fields, the lines of force in which are concentrated and the flow in opposite directions in areas respectively extending across and along the line being welded on different sides of the arc.

7. In metal work by electricity, the steps which consist in establishing an arc between the work and a suitable electrode, and at the same time directing the arc by means of magnetic fields, the lines of force in which encompass a closed area and are concentrated in and flow in opposite directions in areas respectively extending across and along the line being welded on different sides of the arc.

8. Apparatus for use in stabilizing an electric welding arc comprising a plurality of electro-magnets, all of the poles of said electro-magnets being arranged to extend toward the work and so positioned relatively to each other that a line drawn through successively arranged poles encompasses the area in which the arc is to be maintained, directed and stabilized.

9. Apparatus for use in stabilizing an electric welding arc comprising a plurality of electro-magnets, all of the poles of said electro-magnets being arranged to extend toward the work and so positioned relatively to each other that a line drawn through successively arranged poles encompasses the area in which the arc is to be maintained, directed and stabilized and successive poles on such line being of different polarity.

10. In metal working by electricity, the steps which consist in establishing an arc between the work and a suitable electrode, and at the same time directing the arc by means of A. C. magnetic fields, the lines of force in which are concentrated in areas respectively extending across and along the line being welded on different sides of the arc.

11. In metal working by electricity, the steps which consist in establishing an arc between the work and a suitable electrode, and at the same time directing the arc by means of magnetic fields, the lines of force in which are concentrated and flow in opposite directions in areas respectively extending across and along the line being welded on different sides of the arc and independently varying the strength of said fields.

BERNARD J. BRUGGE.